United States Patent
Bang et al.

(10) Patent No.: US 9,804,477 B2
(45) Date of Patent: Oct. 31, 2017

(54) ACTUATOR DRIVING APPARATUS AND CAMERA MODULE INCLUDING THE SAME

(71) Applicant: SAMSUNG ELECTRO-MECHANICS CO., LTD., Suwon-si (KR)

(72) Inventors: Je Hyun Bang, Suwon-si (KR); Shin Young Cheong, Suwon-si (KR); Byung Gi An, Suwon-si (KR); Hoon Heo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/242,910

(22) Filed: Aug. 22, 2016

(65) Prior Publication Data

US 2017/0146889 A1    May 25, 2017

(30) Foreign Application Priority Data

Nov. 23, 2015   (KR) .......................... 10-2015-0164183

(51) Int. Cl.
| | |
|---|---|
| *G03B 17/00* | (2006.01) |
| *G03B 13/36* | (2006.01) |
| *G02B 7/09* | (2006.01) |
| *G02B 27/64* | (2006.01) |
| *G03B 5/02* | (2006.01) |
| *H02K 41/035* | (2006.01) |

(52) U.S. Cl.
CPC .............. *G03B 13/36* (2013.01); *G02B 7/09* (2013.01); *G02B 27/646* (2013.01); *G03B 5/02* (2013.01); *H02K 41/0354* (2013.01); *G03B 2205/0007* (2013.01)

(58) Field of Classification Search
USPC .......................................... 396/55
See application file for complete search history.

(56) References Cited

U.S. PATENT DOCUMENTS

| | | | |
|---|---|---|---|
| 8,995,241 B1* | 3/2015 | Heo ........................ | G02B 7/023 359/557 |
| 2006/0256209 A1* | 11/2006 | Yoshida ............... | H04N 17/002 348/229.1 |

(Continued)

FOREIGN PATENT DOCUMENTS

| | | | |
|---|---|---|---|
| JP | 2010-151986 | * | 7/2010 |
| JP | 2010-151986 A | | 7/2010 |

(Continued)

OTHER PUBLICATIONS

Korean Office Action dated Jun. 21, 2017 in Counterpart Korean Application No. 10-2015-0164183 (12 pages with English translation).

*Primary Examiner* — Rodney Fuller
(74) *Attorney, Agent, or Firm* — NSIP Law (57) ABSTRACT

An actuator driving apparatus includes an inductor disposed on a housing to face a magnetic body attached to a lens carrier, a detector configured to apply a reference signal to the inductor and detect an inductor current flowing through the inductor, a calculator configured to determine a position of the lens carrier based on the inductor current, and a driver configured to drive an actuator based on the position of the lens carrier and a position control signal.

19 Claims, 5 Drawing Sheets

(56) References Cited

U.S. PATENT DOCUMENTS

| | | | |
|---|---|---|---|
| 2007/0223903 A1* | 9/2007 | Ho | G03B 3/10 396/85 |
| 2007/0229702 A1* | 10/2007 | Shirono | G02B 7/102 348/374 |
| 2008/0143346 A1* | 6/2008 | Rober | H01F 7/1844 324/654 |
| 2008/0317452 A1 | 12/2008 | Kim et al. | |
| 2009/0060487 A1 | 3/2009 | Lee et al. | |
| 2009/0160955 A1* | 6/2009 | Tabuchi | G03B 5/00 348/208.6 |
| 2009/0160962 A1* | 6/2009 | Tabuchi | G03B 5/00 348/208.99 |
| 2009/0180202 A1* | 7/2009 | Knoedgen | H04N 5/23212 359/824 |
| 2010/0182490 A1* | 7/2010 | Seol | G02B 7/08 348/345 |
| 2010/0208369 A1* | 8/2010 | Shin | G02B 7/023 359/811 |
| 2013/0293179 A1* | 11/2013 | Lee | H02P 25/034 318/647 |
| 2013/0321937 A1 | 12/2013 | Baik et al. | |
| 2015/0215542 A1* | 7/2015 | Nomura | H04N 5/23287 348/208.11 |
| 2016/0033737 A1* | 2/2016 | Lu | G02B 7/09 359/824 |
| 2016/0085086 A1* | 3/2016 | Rho | G02B 27/646 348/208.99 |
| 2016/0178869 A1* | 6/2016 | Shen | G02B 13/0035 348/208.11 |
| 2016/0202494 A1* | 7/2016 | Seo | G03B 5/00 359/557 |
| 2016/0320584 A1* | 11/2016 | Lee | G01D 5/145 |

FOREIGN PATENT DOCUMENTS

| | | |
|---|---|---|
| KR | 10-2008-0112065 A | 12/2008 |
| KR | 10-0880672 B1 | 2/2009 |
| KR | 10-2009-0023874 A | 3/2009 |
| KR | 10-2012-0032353 A | 4/2012 |
| KR | 10-2013-0077216 A | 7/2013 |
| KR | 10-2013-0077217 A | 7/2013 |
| KR | 10-1332043 B1 | 11/2013 |

* cited by examiner

FIG. 6

ACTUATOR DRIVING APPARATUS AND CAMERA MODULE INCLUDING THE SAME

CROSS-REFERENCE TO RELATED APPLICATION

This application claims the benefit under 35 USC 119(a) of Korean Patent Application No. 10-2015-0164183 filed on Nov. 23, 2015 in the Korean Intellectual Property Office, the entire disclosure of which is incorporated herein by reference for all purposes.

BACKGROUND

1. Field

The following description relates to an actuator driving apparatus and a camera module including the same.

2. Description of Related Art

In general, a camera module mounted in an electronic device includes a lens barrel including a lens therein, a lens carrier having the lens barrel, a housing accommodating the lens carrier therein, and an image sensor for converting an image of a subject into an electric signal. A single focus type camera module that photographs objects by a fixed focus may be used as the camera module. However, with the development of recent technology, a camera module including an actuator that performs an auto-focus control are now often used in electronic devices. In addition, camera modules used in hand-held electronic devices often include an actuator for optical image stabilization (OIS) in order to decrease the resolution reduction caused by the instability of device-holding hands while pictures are taken.

An actuator driving apparatus is used to drive the above-mentioned actuators for performing auto-focus (AF) control or optical image stabilization (OIS). The actuator driving apparatus may detect a position of the lens carrier and drive the actuator so that the lens carrier is moved to a target position depending on the position of the lens carrier and a position control signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator driving apparatus includes an inductor disposed on a housing to face a magnetic body attached to a lens carrier, a detector configured to apply a reference signal to the inductor and detect an inductor current flowing through the inductor, a calculator configured to determine a position of the lens carrier based on the inductor current, and a driver configured to drive an actuator based on the position of the lens carrier and a position control signal.

The inductor may be a coil, and a movement of the magnetic body relative to the coil may change inductance of the coil.

A diameter of the coil may be larger than a maximum displacement of the magnetic body.

The reference signal may be a square wave voltage signal.

A pulse width of the reference signal may be shorter than a steady-state arrival time of the inductor current.

The inductor and the actuator may be disposed on two opposing side surfaces of the housing.

The detector, the calculator and the driver may include one or more integrated circuit.

In another general aspect, a camera module includes a lens carrier disposed in a housing, a magnetic body attached to the lens carrier, an actuator configured to move the lens carrier within the housing, and an actuator driving apparatus configured to drive the actuator, and actuator driving apparatus includes a inductor disposed on the housing, a detector configured to apply a reference signal to the inductor to detect an inductor current flowing through the inductor, a calculator configured to determine a position of the lens carrier based on the inductor current, and a driver configured to drive the actuator based on the position of the lens carrier and a position control signal.

The inductor may be a coil, and a movement of the magnetic body may change inductance of the inductor.

A diameter of the coil may be larger than a maximum displacement of the magnetic body.

The reference signal may be a square wave voltage signal.

A pulse width of the reference signal may be shorter than a steady-state arrival time of the inductor current.

The inductor and the actuator may be disposed on opposing side surfaces of the housing.

The actuator includes a voice coil motor (VCM).

In another general aspect, a camera module includes a magnetic body configured to move with a lens carrier, an actuator configured to move the lens carrier, an inductor configured to interact with the magnetic body, and a circuit configured to drive the actuator based on an inductance generated in the inductor by the magnetic body.

The inductor may include a coil, and the magnetic body may be movable with respect to the coil such that the movement of the lens carrier within the housing changes the inductance of the inductor.

The circuit may be configured to determine the inductance of the inductor by applying a reference signal to the inductor and detecting an inductor current flowing through the inductor.

The circuit may be configured to determine a position of the lens carrier based on the inductance.

The inductor may be configured to be stationary when the actuator moves the lens carrier and the magnetic body.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, embodiments will be described as follows with reference to the attached drawings.

Throughout the specification, it will be understood that when an element, such as a layer, region or module, is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the illustrated embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing illustrative embodiments only and is not intended to be limiting. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments will be described with reference to schematic view. In the drawings, for example, due to manufacturing techniques and/or tolerances, modifications of the shape shown may result. Thus, embodiments should not be construed as being limited to the illustrated shapes of regions shown herein, but should, for example, be understood to include a change in shape resulting from manufacturing. The following embodiments may also be constituted by one or a combination thereof.

Before describing an example of an actuator driving apparatus in detail, the overall structure and functions of an example of a camera module will be described with reference to FIGS. 1 through 3.

Figure 1:
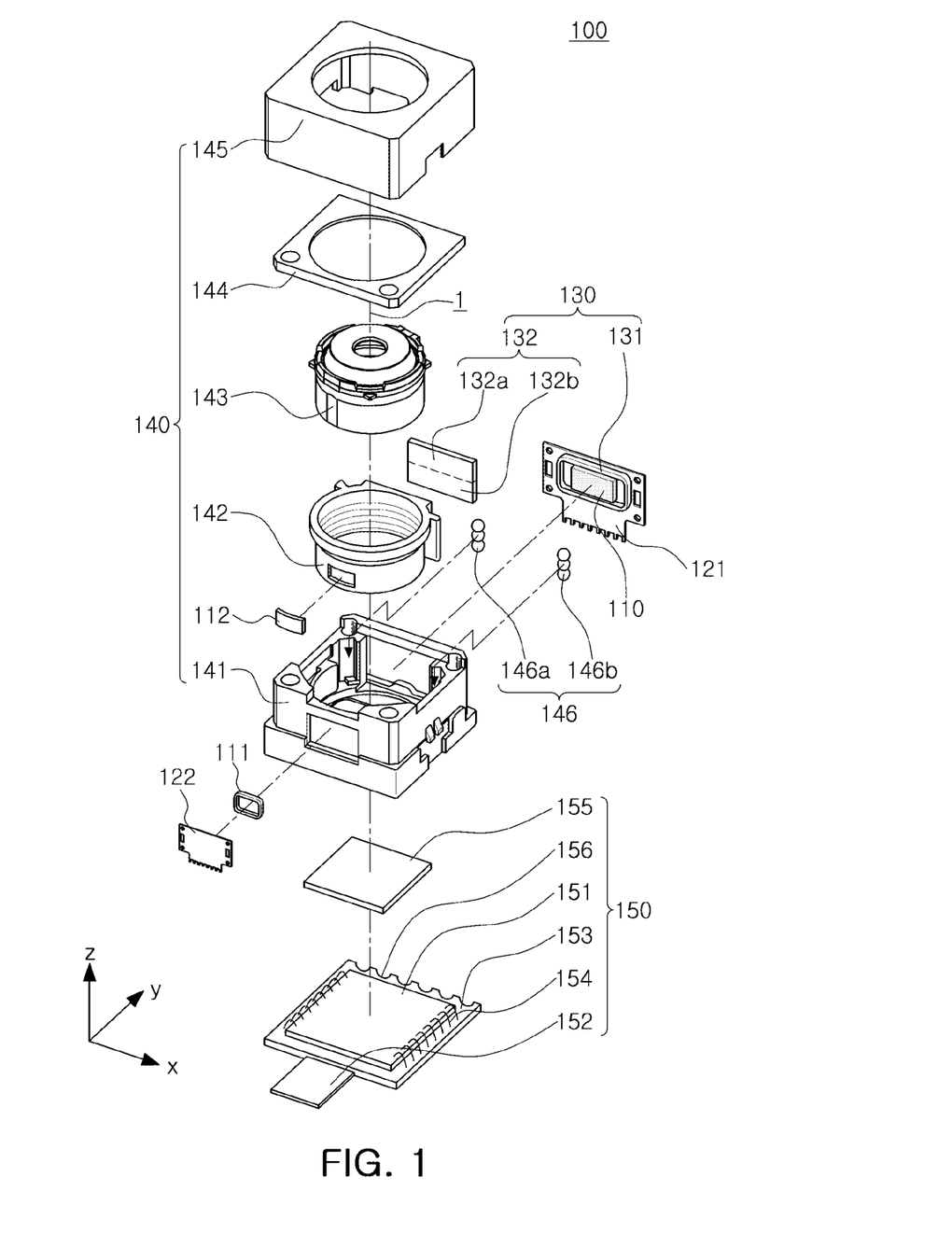
FIG. 1 is an exploded perspective diagram illustrating an example of a camera module including an actuator driving apparatus.
Figure 2:
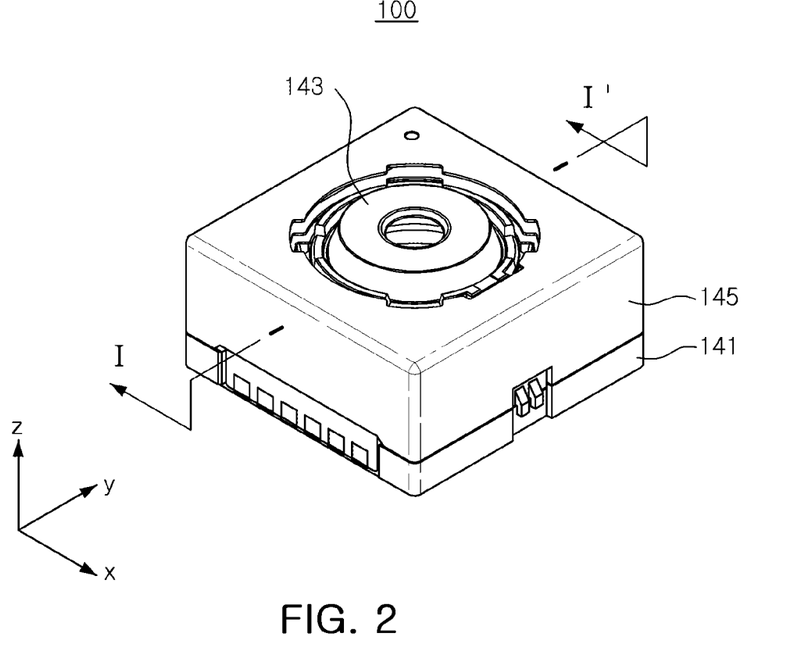
FIG. 2 is an assembled perspective diagram of the camera module illustrated in FIG. 1.
Figure 3:
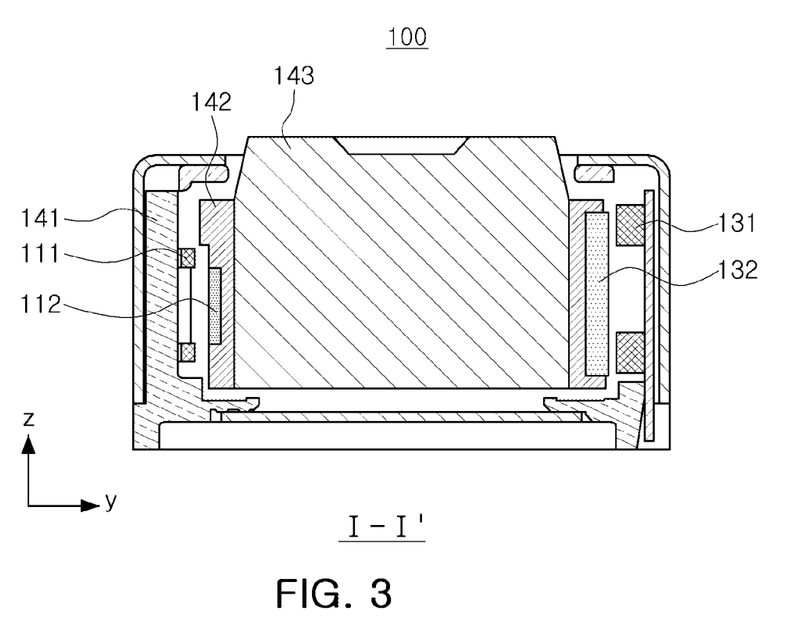
FIG. 3 is a cross-sectional diagram of the camera module illustrated in FIG. 1.

Although, for convenience of explanation, an example in which a camera module 100 includes one actuator for an auto-focus function is illustrated in FIGS. 1 through 3, in another example, the camera module 100 may include a plurality of actuators in order to have a hand instability compensation function or an optical image stabilization (OIS) function.

FIG. 1 is an exploded perspective diagram of an example of a camera module including an actuator driving apparatus, and FIG. 2 is an assembled perspective diagram of the camera module according to the example illustrated in FIG. 1.

Referring to FIGS. 1 and 2, the camera module 100 includes an actuator driving apparatus 110, an actuator 130, a lens module 140, and an image sensor module 150.

The actuator driving apparatus 110 may determine a position of a lens carrier 142 and output a control signal (for example, a current signal) for driving the actuator 130 based on the position of the lens carrier 142 and a position control signal obtained from outside. In this, the actuator driving apparatus 110 is disposed on one surface of a first board 121. However, the present description is not limited thereto.

Although an example in which the actuator driving apparatus 110 is disposed in a central region of a driving coil 131 is illustrated in FIG. 1, in another example, a position of the actuator driving apparatus 110 may be changed.

The actuator driving apparatus 110 includes a sensing inductor 111 in order to determine the position of the lens carrier 142.

The sensing inductor 111 is disposed on one surface of a second board 122 and disposed on a housing so as to face a sensing magnetic body 112. For instance, in the example illustrated in FIG. 1, the sensing inductor 111 is disposed on a first side surface of the housing, and the actuator is disposed on a second side surface of the housing opposite to the first side surface. Further, the sensing magnetic body 112 is disposed on a portion of an outer surface of the lens carrier 142 on which a driving magnetic body 132 is not formed.

Meanwhile, the sensing inductor 111 may be a coil having inductance that is changed based on a position of the sensing magnetic body 112. The sensing magnetic body 112 may be formed of aluminum interacting with an electric field of the sensing inductor 111 or a magnetic material generating a magnetic field.

A detailed configuration and functions of the actuator driving apparatus 110 will be described below with reference to FIGS. 5 and 6.

The actuator 130 may receive the control signal from the actuator driving apparatus 110 to generate driving force capable of moving the lens carrier 142 in an optical axis (1) direction.

To this end, the actuator 130 may include one of a rotation motor, a piezo actuator, and a voice coil motor, but is not limited thereto. Hereinafter, the actuator 130 will be described under the assumption that the actuator 130 includes the voice coil motor.

In this example, the actuator 130 includes the driving coil 131 and the driving magnetic body 132.

The driving coil 131 is disposed on one surface of the first board 121, and the driving magnetic body 132 is attached to the lens carrier 142 so as to face the driving coil 131.

In this example, the driving coil 131 is disposed along a circumference of the actuator driving apparatus 110. However, the present disclosure is not limited thereto.

Meanwhile, the first and second boards 121 and 122 on which the driving coil 131 and the sensing inductor 111 are disposed, respectively, may be printed circuit boards. Each of the first and second boards 121 and 122 are disposed on one side surface of the housing 141 in FIG. 1. However, in another example, the driving coil 131 and the sensing inductor 111 may be directly disposed on the housing, the first and second boards 121 and 122 may be omitted.

The control signal (for example, the current signal) from the actuator driving apparatus 110 may be supplied to the driving coil 131 included in the actuator 130 to form an electric field, and the electric field may interact with the magnetic field of the driving magnetic body 132, thereby generating driving force moving the lens carrier 142 in the optical axis (1) direction according to Fleming's left hand rule.

The driving magnetic body 132 may react with the magnetic field generated when a current flows in the driving coil 131, thereby generating driving force.

Further, referring to FIG. 1, the driving magnetic body 132 includes first and second magnetic bodies 132*a* and 132*b*. The first and second magnetic bodies 132*a* and 132*b* may be formed by polarization of the driving magnetic body 132, and thus it may be easy to control movement of the lens carrier 142.

The lens module 140 includes the housing 141 accommodating the lens carrier 142 having a lens barrel 143 therein, a stopper 144 restricting movement of the lens carrier 142 in the optical axis (1) direction, and a shield case 145 enclosing the housing 141.

In the lens barrel 143, at least one lens may be assembled by an adhesive method or a screw-coupling method.

Ball bearings 146 are disposed in internal guides of the housing 141 to support movement of the lens carrier 142 in the optical axis direction by a rolling motion. Referring to FIG. 1, the ball bearings 146 are further divided into ball bearings 146*a* and 146*b* to thereby be disposed in two internal guides of the housing 141, which are grooves formed on side walls of the housing 141. A lubricant may be applied on surfaces of the ball bearings 146.

An image sensor module 150 is disposed below the housing 141 and includes an image sensor 151, a flexible printed circuit 152, and a circuit board 153. The image sensor 151 is disposed on an image formation surface and mounted on one surface of the circuit board 153 by a wire bonding 154. The flexible printed circuit 152 extends from the circuit board 153 to connect with an internal circuit of an electronic apparatus. The electronic apparatus may be a camera, a mobile communications terminal, or the like. A coupling part 156 coupled to the first board 121 is provided at one end portion of the circuit board 153. In addition, in this example, the image sensor module 150 further includes an IR filter 155 for filtering an incident image so that the image sensor 151 receives a filtered image.

In this example, an actuator driving apparatus capable of accurately driving an actuator by determining a position of a lens carrier depending on a change in an inductor current flowing in a sensing inductor is used a camera module. Thus, a separate location sensor such as a Hall sensor may not be required to determine the position of the lens carrier or to drive the actuator.

FIG. 3 is a cross-sectional diagram of the camera module according to the example illustrated in FIG. 1.

Referring to FIG. 3, the sensing magnetic body 112 is attached to one side surface of the lens carrier 142 that accommodates the lens barrel 143 therein, and the driving magnetic body 132 is attached to the other side surface of the lens carrier opposing one side surface thereof.

Further, the sensing inductor 111 is disposed on one inner side surface of the housing 141 to face the sensing magnetic body 112, and the driving coil 131 is disposed on the other inner side surface of the housing 141 opposing an inner side surface thereof. By disposing the driving coil 131 to be spaced apart from the sensing inductor 111 as described above, an influence of an electric field by the driving coil 131 on the sensing inductor 111 may be significantly decreased.

According to one example, the sensing inductor 111 may be formed of a coil, and the sensing inductor 111 may have a diameter larger than the maximum displacement of the sensing magnetic body 112 caused by movement of the lens carrier 142. By forming the sensing inductor 111 to have a larger diameter than the maximum displacement permitted for the sensing magnetic body 112, a change in inductance of the sensing inductor 111 based on a change in position of the sensing magnetic body 112 may be sensed up to the maximum displacement of the sensing magnetic body 112.

Figure 4A:
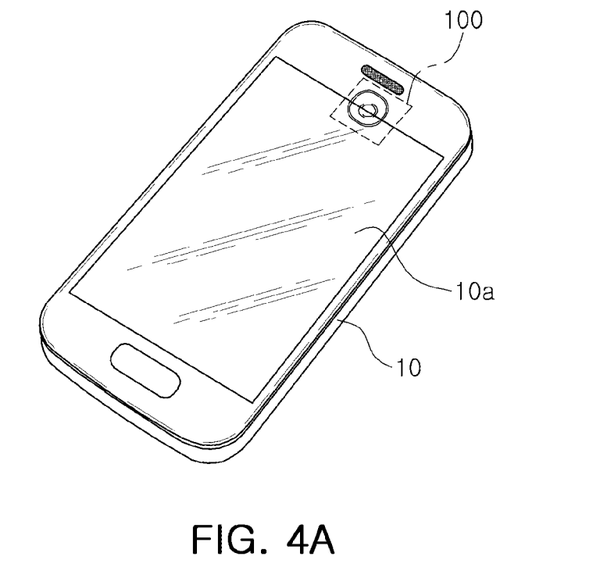
FIGS. 4A and 4B are schematic diagrams illustrating an exterior of an electronic apparatus including an example of a camera module.
Figure 4B:
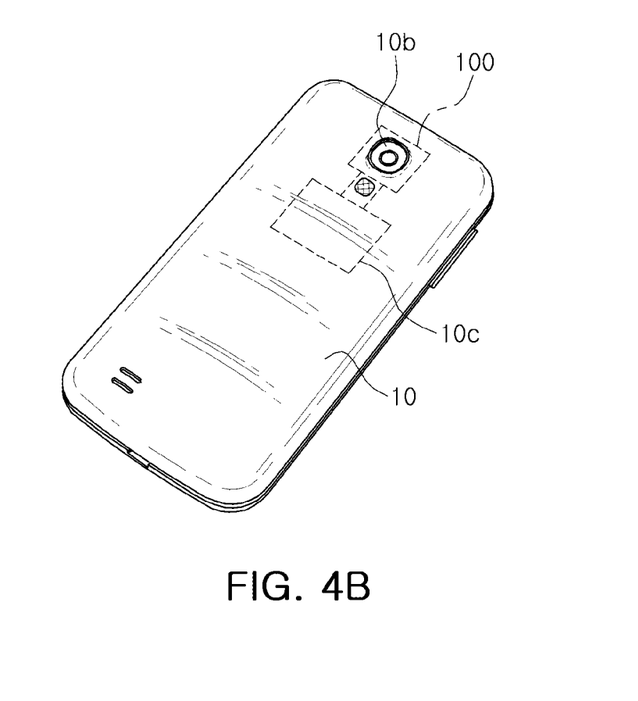

FIGS. 4A and 4B are schematic diagrams illustrating an exterior of an electronic apparatus including a camera module according to an example.

Referring to FIGS. 4A and 4B, an electronic apparatus 10 includes a camera module 100, and a lens of the camera module 100 is externally exposed from a surface of the electronic apparatus 10 through an opening 10*b* of the electronic apparatus 10 in order to allow the camera module 100 to thereby capture an image of an external subject.

The camera module 100 may be electrically connected to a control part 10*c* of the electronic apparatus 10 to perform a control operation depending on user selection.

Meanwhile, although not illustrated in FIG. 4B, the control part 10*c* may include an application integrated circuit (IC) outputting a position control signal to an actuator driving apparatus.

Figure 5:
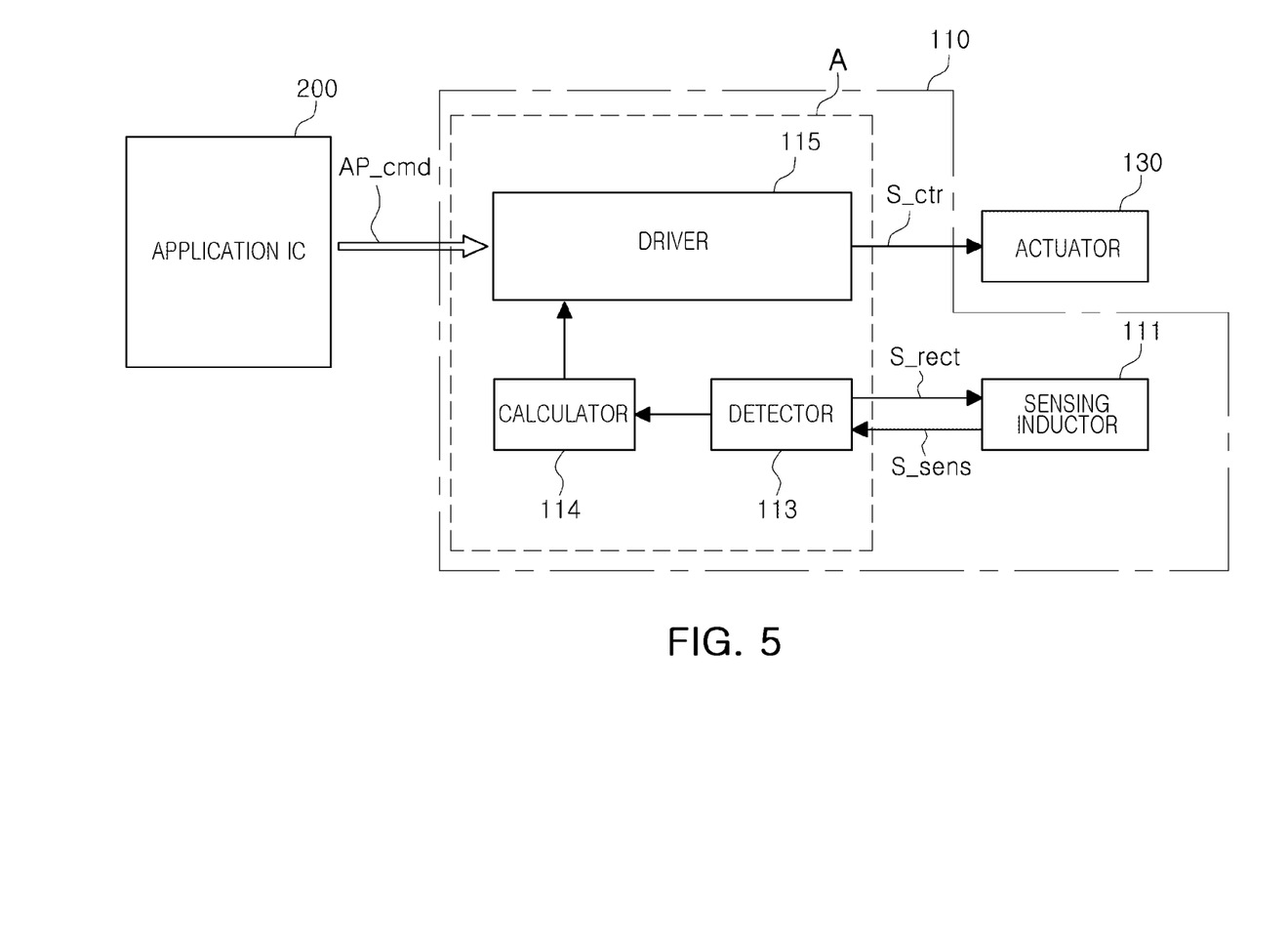
FIG. 5 is a block diagram illustrating an example of an actuator driving apparatus.

FIG. 5 is a block diagram illustrating an example of an actuator driving apparatus.

Referring to FIG. 5, an actuator driving apparatus 110 includes a sensing inductor 111, a detector 113, a calculator 114, and a driver 115.

The detector 113, the calculator 114, and the driver 115 may be configured as a single integrated circuit as illustrated by a dotted line A, or may be configured as two or more integrated circuits.

The single integrated circuit may be implemented, for example, by combination of hardware such as a microprocessor, or the like, and software mounted in the hardware and programmed so as to operate a predetermined operation.

The hardware may include at least one processor. The processor may include, for example, a central processing unit (CPU), a microprocessor, an application specific integrated circuit (ASIC), field programmable gate arrays (FPGAs), or the like, and may have a plurality of cores.

Hereinafter, an operation of the actuator driving apparatus 110 according to the example will be sequentially described in accordance with a flow of a signal from the sensing inductor 111.

The sensing inductor 111 may receive a reference signal from the detector 113, and thus an inductor current may flow in the sensing inductor 111.

Further, because the sensing inductor 111 is disposed to face the sensing magnetic body 112 (in FIG. 1) as illustrated in FIG. 1, inductance of the sensing inductor 111 may be changed due to a change in position of the sensing magnetic body, and a level of the inductor current flowing in the sensing inductor 111 may be changed due to the change in inductance.

The detector 113 may apply the reference signal S_rect to the sensing inductor 111 and detect the inductor current (S_sens) flowing in the sensing inductor 111. In this example, the reference signal S_rect may be a square wave voltage signal.

The calculator 114 may determine the position of the lens carrier 142 (in FIG. 1) based on the inductor current. For example, the calculator 114 may determine the position of the lens carrier based on the inductor current using mapping data pre-stored in a memory (not illustrated). In addition, the calculator 114 may calculate inductance based on a voltage level of the reference signal S_rect and a level of the inductor current, and output position information of the lens carrier corresponding to the calculated inductance to the driver 115.

The memory may be formed of a non-volatile memory, and the non-volatile memory may be a flash memory, an electrically erasable programmable read-only memory (EEPROM), or a ferroelectric random access memory (FeRAM).

The driver 115 may drive the actuator based on the position information of the lens carrier input from the calculator 114 and a position control signal Ap_cmd. In addition, the position control signal Ap_cmd may be input from the application IC 200.

For example, the position control signal Ap_cmd input in the actuator driving apparatus 110 may include position information indicating a target position of the lens carrier desired to be moved by the user, that is, target displacement of the lens carrier.

The driver 115 may compensate for the position control signal Ap_cmd using the position of the lens carrier. Thereafter, the driver 115 may output a control signal S_ctr for driving the actuator based on the compensated position control signal Ap_cmd.

For example, the control signal S_ctr output by the driver 115 may be a current signal, and the driver 115 may include an H bridge driver capable of performing bi-directional driving.

Figure 6:
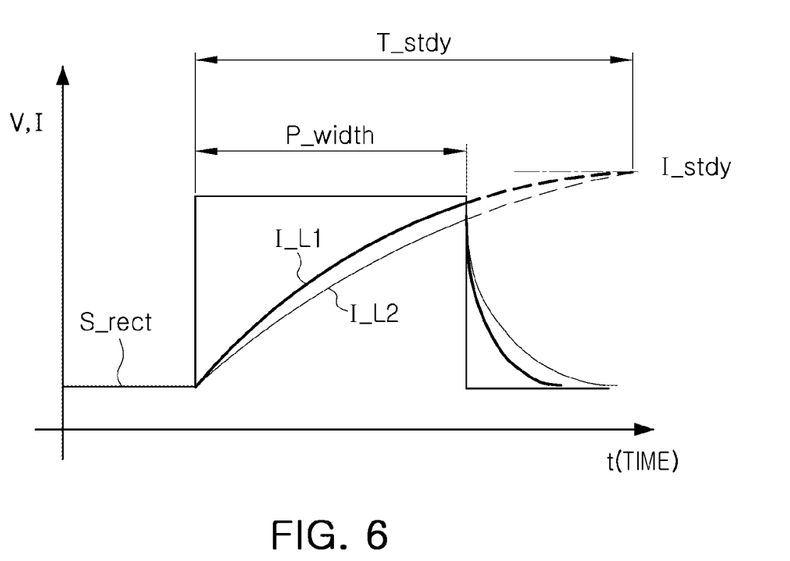
FIG. 6 is a waveform diagram illustrating an example of a reference signal and an inductor current.

FIG. 6 is a waveform diagram illustrating a reference signal and an inductor current according to the example described with reference to FIG. 5.

Referring to FIG. 6, the reference signal S_rect, which is a square wave voltage signal applied to the sensing inductor 111 (in FIG. 5) by the detector 113 (in FIG. 5), may be confirmed.

Inductor currents I_L1 and I_L2 flowing in the sensing inductor by the reference signal S_rect may have different waveforms depending on different inductances of the sensing inductor.

The detector 113 (in FIG. 5) of the actuator driving apparatus detects these inductor currents to determine the position of the lens carrier. Further, the detector may detect the inductor current at a high level section of the reference signal S_rect or detect the inductor current at a falling time of the reference signal S_rect.

Meanwhile, when the high level section of the reference signal S_rect is maintained for a sufficiently long time period, the inductor currents I_L1 and I_L2 may arrive at a steady state, having a constant current value 1_stdy in the section.

Therefore, when a pulse width P_width of the reference signal S_rect is larger than a steady-state arrival time T_stdy of the inductor current, it may be difficult to accurately detect the inductor current.

In order to accurately detect the inductor current, the pulse width P_width of the reference signal S_rect may be set to be shorter than the steady-state arrival time of the inductor current.

As set forth above, according to examples, the actuator driving apparatus and the camera module including the same may determine the position of the lens carrier based on the inductor current flowing in the sensing inductor. In this case, a separate Hall sensor may not be needed to determine the position of the lens carrier.

Further, because a separate position sensor is not required, the cost of production may be decreased, and space efficiency may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator driving apparatus comprising:
   an inductor disposed on a housing to face a magnetic body attached to a lens carrier;
   a detector configured to apply a reference signal to the inductor and detect an inductor current flowing through the inductor;
   a calculator configured to determine a position of the lens carrier based on the inductor current; and a driver configured to drive an actuator based on the position of the lens carrier and a position control signal.

2. The actuator driving apparatus of claim 1, wherein the inductor is a coil, and a movement of the magnetic body relative to the coil changes inductance of the coil.

3. The actuator driving apparatus of claim 2, wherein a diameter of the coil is larger than a maximum displacement of the magnetic body.

4. The actuator driving apparatus of claim 1, wherein the reference signal is a square wave voltage signal.

5. The actuator driving apparatus of claim 4, wherein a pulse width of the reference signal is shorter than a steady-state arrival time of the inductor current.

6. The actuator driving apparatus of claim 1, wherein the inductor and the actuator are disposed on two opposing side surfaces of the housing.

7. The actuator driving apparatus of claim 1, wherein the detector, the calculator and the driver comprise one or more integrated circuit.

8. The actuator driving apparatus of claim 1, wherein the position control signal is a target position of the lens carrier.

9. A camera module comprising:
a lens carrier disposed in a housing;
a magnetic body attached to the lens carrier;
an actuator configured to move the lens carrier within the housing; and
an actuator driving apparatus configured to drive the actuator,
wherein the actuator driving apparatus comprises a inductor disposed on the housing, a detector configured to apply a reference signal to the inductor to detect an inductor current flowing through the inductor, a calculator configured to determine a position of the lens carrier based on the inductor current, and a driver configured to drive the actuator based on the position of the lens carrier and a position control signal.

10. The camera module of claim 9, wherein the inductor is a coil, and a movement of the magnetic body changes inductance of the inductor.

11. The camera module of claim 10, wherein a diameter of the coil is larger than a maximum displacement of the magnetic body.

12. The camera module of claim 9, wherein the reference signal is a square wave voltage signal.

13. The camera module of claim 12, wherein a pulse width of the reference signal is shorter than a steady-state arrival time of the inductor current.

14. The camera module of claim 9, wherein the inductor and the actuator are disposed on opposing side surfaces of the housing.

15. The camera module of claim 9, wherein the actuator comprises a voice coil motor (VCM).

16. A camera module comprising:
a magnetic body configured to move with a lens carrier;
an actuator configured to move the lens carrier;
an inductor configured to interact with the magnetic body; and
a circuit configured to drive the actuator based on an inductance generated in the inductor by the magnetic body,
wherein the circuit is configured to determine the inductance of the inductor by applying a reference signal to the inductor and detecting an inductor current flowing through the inductor.

17. The camera module of claim 16, wherein the inductor comprises a coil, and the magnetic body is movable with respect to the coil such that the movement of the lens carrier within the housing changes the inductance of the inductor.

18. The camera module of claim 16, wherein the circuit is configured to determine a position of the lens carrier based on the inductance.

19. The camera module of claim 16, wherein the inductor is configured to be stationary when the actuator moves the lens carrier and the magnetic body.

* * * * *